United States Patent
Tschirner et al.

(10) Patent No.: US 6,939,931 B2
(45) Date of Patent: Sep. 6, 2005

(54) PROCESS FOR PREPARING SOLID POLYVINYL ESTER RESINS

(75) Inventors: Peter Tschirner, Emmerting (DE); Andreas Lumpp, Burghausen (DE); Robert Singer, Burghausen (DE); Guenter Braunsperger, Kirchdorf (DE)

(73) Assignee: Wacker Polymer Systems GmbH & Co. KG, Burghausen (DE)

( * ) Notice: Subject to any disclaimer, the term of this patent is extended or adjusted under 35 U.S.C. 154(b) by 0 days.

(21) Appl. No.: 10/366,249

(22) Filed: Feb. 13, 2003

(65) Prior Publication Data

US 2003/0195319 A1 Oct. 16, 2003

(30) Foreign Application Priority Data

Apr. 11, 2002 (DE) .......................... 102 15 961

(51) Int. Cl.$^7$ ................................. C08F 2/02
(52) U.S. Cl. .................. 526/208; 526/210; 526/319; 526/330; 526/321
(58) Field of Search ................ 526/210, 208, 526/319, 330, 321

(56) References Cited

U.S. PATENT DOCUMENTS

| | | | | |
|---|---|---|---|---|
| 2,704,753 A | * | 3/1955 | Monaghan .................. | 526/208 |
| 3,804,886 A | | 4/1974 | Hoffman et al. | |
| 5,326,644 A | * | 7/1994 | Scholz et al. ............... | 428/514 |
| 5,866,655 A | * | 2/1999 | Fujiwara et al. ............. | 525/60 |

FOREIGN PATENT DOCUMENTS

| | | |
|---|---|---|
| DE | 1235591 | 3/1967 |
| DE | 2830324 | 2/1979 |
| EP | 0 230 506 | 8/1987 |
| JP | 67-22055 | 10/1967 |
| JP | 51-87594 | 7/1976 |
| JP | 57105410 | 12/1980 |
| JP | 58-38793 | 3/1983 |
| JP | 01026602 | 1/1989 |

OTHER PUBLICATIONS

JP 73038793B (abstract), Derwent Publication (1973).*
English Caplus Abstract corresp. to JP 67–22055 [AN 1968: 40304].
English Caplus Abstract corresp. to JP 51–87594 [AN 1976: 561169].
CPI–Profile Booklet—Abstract corresp. to JP 58–38793.
Derwent Abstact corresp. to DE 1235591 [AN 1968–21940P].
Derwent Abstract corresponding to DE 2830324 [AN 1979—12242B].
Japio Abstract corresponding to JP 01026602 [AN 1989–026602].
Derwent Abstract corresponding to JP 57105410 [AN 1982–66603E].

* cited by examiner

Primary Examiner—William K. Cheung
(74) Attorney, Agent, or Firm—Brooks Kushman P.C.

(57) ABSTRACT

The invention relates to a process for preparing solid polyvinyl ester resins using a bulk or solution polymerization process in the presence of a chain transfer agent, wherein one or more vinyl esters of unbranched or branched alkyl carboxylic acids having 1 to 15 carbon atoms are polymerized in the presence of a compound selected from the group consisting of monovalent aliphatic alcohols having 1 to 6 carbon atoms, esters of aliphatic monocarboxylic acids and aliphatic alcohols each having 1 to 4 carbon atoms, or aliphatic ketones having 3 to 6 carbon atoms.

20 Claims, No Drawings

PROCESS FOR PREPARING SOLID POLYVINYL ESTER RESINS

BACKGROUND OF THE INVENTION

1. Field of the Invention

The invention relates to a process for preparing solid polyvinyl ester resins in the presence of chain transfer agents.

2. Background Art

For many applications, the rheological properties of polymers are of critical importance. The rheological properties for a given polymer are primarily determined by the molecular weight and hence the degree of polymerization. In the case of polymers which are prepared by free-radical polymerization, the molecular weight can be regulated in differing ways, for example using what are termed chain transfer agents, i.e. substances which may be added to regulate the degree of polymerization of the reaction. Very high transfer constants are exhibited by halogenated compounds and mercaptans ($C_r=10^{-1}$ to $10^1$). In the case of such pronounced effects, the consumption of the chain transfer agent is very high, so that the chain transfer agent must be metered into the reaction mixture to keep its concentration constant.

DE-A 2830324 discloses a process for preparing polyvinyl acetate, which is used in particular as base polymer for chewing gum, in the presence of acetaldehyde as chain transfer agent. It is a disadvantage of this process that the polyvinyl acetate thus prepared is unstable under thermal stress and when in contact with nucleophilic substances. Thus, in the case of storage for several hours at 120° C., in addition to an intense yellow discoloration, a pungent odor of acetic acid can be detected. As a result of the contact with bases and with other nucleophiles, for example the sweetener aspartame, a yellowish-brown discoloration of the product is observed. The above-described effects are due to the use of acetaldehyde as a chain transfer agent, as a result of which, methyl ketone end groups are introduced into the polymer. The acid $CH_2$ group in such end groups can be converted by bases into the corresponding anion. The system then stabilizes with elimination of an acetate group and the formation of an $\alpha,\beta$-unsaturated ketone. The resultant vinylogous carbonyl compound again has an acidic $CH_2$ group, so that the entire process can repeat. It is possible by UV spectroscopy, to detect a conjugated double bond system having approximately 5 to 6 double bonds which forms in a very short time. At elevated temperature, the traces of acetic acid and water present in the polymer are already sufficiently nucleophilic to lead to the formation of conjugated double bond systems.

Japanese applications JP-A 01026602 and JP-A 57105410 disclose polymerizing low-molecular weight polyvinyl acetate in the presence of mercaptans. Disadvantages here are the remaining odor of these polymers, their strong tendency to produce discolored, yellow products, and the technical difficulty of constant metering of very small amounts of mercaptan over relatively long time periods, due to the high transfer constants of these compounds.

To prepare polyvinyl acetate solid resin for applications in the chewing gum field, however, regulating substances must be used to obtain desirably low molecular weights, since the molecular weight determines the chewing properties (rheological properties). Thus, it would be desirable to provide a process for preparing solid polyvinyl ester resins by which low-molecular-weight polymers are accessible, without the abovementioned undesirable side effects such as thermal and chemical instability.

SUMMARY OF THE INVENTION

The invention relates to a process for preparing solid polyvinyl ester resins using bulk or solution polymerization process in the presence of chain transfer agents, which comprises polymerizing one or more vinyl esters of unbranched or branched alkyl carboxylic acids having 1 to 15 carbon atoms in the presence of one or more compounds selected from the group consisting of monovalent aliphatic alcohols having 1 to 6 carbon atoms, esters of aliphatic monocarboxylic acids and aliphatic alcohols each having 1 to 4 carbon atoms, and aliphatic ketones having 3 to 6 carbon atoms.

DETAILED DESCRIPTION OF THE PREFERRED EMBODIMENT(S)

Preferred alcohols for use as chain transfer agents are methanol, ethanol, n-propanol, isopropanol, butanol, isobutanol, and t-butanol. Particular preference is given to ethanol and isopropanol. Preferred esters are methyl acetate and ethyl acetate. Of the ketones, preference is given to acetone. Greatest preference is given to isopropanol for preparing low-molecular-weight solid polyvinyl ester resins.

Preferred vinyl esters of which the solid vinyl ester resins are completed are vinyl acetate, vinyl propionate, vinyl laurate and vinyl versatate, the latter being vinyl esters of $\alpha$-branched monocarboxylic acids having 5 to 12 carbon atoms, such as VeoVa9 and VeoVa10 (trade names of Shell). Particular preference is given to vinyl acetate. Optionally, the vinyl ester or esters can be copolymerized with one or more further comonomers. Suitable comonomers include isopropenyl acetate, ethylene and propylene. Possible functional comonomers are carboxyl-group-containing monomers such as crotonic acid, acrylic acid, maleic acid, fumaric acid, itaconic acid and hydroxyl-group-containing monomers such as hydroxyethyl acrylate and hydroxypropyl acrylate. In the case of the vinyl acetate interpolymers, the non-vinyl ester comonomer content is preferably 0.1 to 30% by weight, more preferably 1 to 10% by weight, in each case based on the total weight of all monomers. Greatest preference as comonomers is given to one or more compounds selected from the group consisting of isopropenyl acetate, ethylene, crotonic acid and acrylic acid.

The amount of chain transfer agent is generally such that the molar ratio of vinyl ester and optional comonomer(s) to chain transfer agent is from 0.05 to 40, preferably 0.1 to 20. The amount of chain transfer agent depends on the desired molecular weight and the polymerization process used, for example whether the process is a batch, semibatch, or continuous polymerization, and can be determined in a known manner by those skilled in the art via estimation using the copolymerization equation.

Preparation of the solid polyvinyl ester resins proceeds according to the bulk polymerization or solution polymerization process as a function of how much chain transfer agent is used. The reaction is generally carried out under reflux conditions, generally at a polymerization temperature of 40° C. to 140° C., to utilize evaporative cooling to remove the heat of reaction. In such cases, the polymerization is preferably performed at atmospheric pressure or under slight superatmospheric pressure. In the case of copolymerization of gaseous comonomers such as ethylene, higher pressures, generally 5 to 100 bar, can also be employed. If the reaction is carried out under atmospheric pressure, it is advantageous, at the end of the reaction, to impart a slight superatmospheric pressure to the reaction system, preferably 0.5 to 3 bar, in order to be able to supply energy to the system externally to achieve the highest possible yield, and to render removal of residual monomer(s) and chain transfer agent by distillation as effective as possible.

Initiators used include organic peroxides and azo compounds. Suitable compounds are, for example, diacyl peroxides such as dilauroyl peroxide, peroxyesters such as t-butyl peroxypivalate or t-butyl peroxy-2-ethylhexanoate, or peroxydicarbonates such as diethyl peroxydicarbonate. The amount of initiator is generally 0.01 to 5.0% by weight, based on the weight of the monomers. The initiators can be charged at the beginning, or metered in. It has proven useful to charge a portion of the amount of initiator needed at the beginning and to meter in the remainder continuously during the reaction. The quantity of the subportion charged initially depends on the amount in which the monomer and the chain transfer agent are charged. It can be advantageous to meter in initiators which decompose differently at different time points of the reaction. An initiator decomposing at low temperature at the start and an initiator decomposing at a higher temperature at the end of the reaction, for example at elevated pressure.

To prepare the polymers, a batch process can be employed, with all components of the polymerization batch being initially charged to the reactor, or a semibatch process can be employed, with individual components or a plurality of components or portions thereof being charged initially and the remainder being subsequently added. Continuous polymerizations can also be carried out, with the components being added during the course of the polymerization. The additions can be carried out, if appropriate, separately (in space and time). Since the preparation of very low-molecular-weight substances generally requires relatively large amounts of chain transfer agent, it is preferable to employ a semibatch process in order to achieve the highest possible space-time reactor performance.

In the case of the preferred semibatch process, the monomers and the chain transfer agent may be charged in the desired molar ratio of monomer to chain transfer agent required to establish the degree of polymerization, and optionally, a portion of the initiator is added. Preferably, 5 to 20% by weight of the total amount of the monomer/chain transfer agent mixture are charged. The reaction is started by increasing the temperature and when appropriate, adding initiator. After a conversion rate of 40 to 60% is achieved, the remaining amount of monomer and when appropriate, the remaining initiator are added, more precisely at a metering rate which ensures that the desired molar ratio of monomer/chain transfer agent is achieved and remains relatively constant over the entire reaction period.

After the end of the exothermic reaction, the remaining free monomers and the chain transfer agent are preferably removed by distillation. In order to obtain a very low VOC content, the internal temperature is preferably increased to a temperature in the range of 100° C. to 160° C. and then a vacuum is applied. In this case it has proven to be particularly advantageous that isopropanol acts as an entrainer for vinyl acetate and thus the residual vinyl acetate can be removed particularly rapidly. To remove the residual amounts of chain transfer agent, it can be advantageous, toward the end of the distillation, to add small amounts of water as an entrainer for the chain transfer agent.

Using the claimed procedure, solid polyvinyl ester resins having a weight-average molecular weight $M_w$ of 2,000 to 500,000, preferably 10,000 to 100,000, can be synthesized.

The polyvinyl ester solid resins can be used in solid form or as a solution in organic solvent. They are suitable as binders in paints and for preparing adhesives, in particular heat-sealable coatings and laminating agents. Further applications are those as base materials for fabric finishes and chewing gum bases.

Using the claimed process, low-molecular-weight polyvinyl ester solid resins may be synthesized which, compared with those prepared by conventional methods, are distinguished by enhanced thermal and chemical stability.

EXAMPLES

Example 1

Isopropanol as the Chain Transfer Agent; Batch Procedure 110 kg of vinyl acetate, 110 kg of isopropanol and 100 g of t-butyl peroxy-2-pivalate were charged into a 250 l reactor. The reactor was then heated to 76° C. After the internal temperature was reached, the supply of energy was ceased, and the reaction began. After approximately 4 hours, the exothermic reaction had subsided, and heating was resumed using vessel jacket heating for further reaction for 2 hours at a maximum internal temperature of 120° C. The residual organic constituents were then removed by distillation, first under atmospheric pressure, then under reduced pressure at an absolute pressure of 0.9 bar. To remove residual traces of volatile organic substances, water was added twice, one liter each time, and distilled off under reduced pressure. Yield: 103 kg (94%) of polyvinyl acetate, Viscosity (10% by weight solution in ethyl acetate): 1.3 mPas, Number average molecular weight $M_n$: 4,700, Weight average molecular weight $M_w$: 15,400, Polydispersity ($M_w/M_n$): 3.3, Storage stability (12 hours at 130° C.): colorless and odorless.

Example 2

Isopropanol Chain Transfer Agent; Semibatch Procedure 30 kg of isopropanol and 10 kg of vinyl acetate together with 45 ml of t-butyl peroxypivalate (75% strength in isododecane) were charged into a 250 l reactor and the reactor was heated to 65° C., after which heating was stopped, and the reaction began. As soon as the internal temperature had reached 76° C., vinyl acetate metering was started. Vinyl acetate was metered in at the following gradient: first at 11 kg/h, and then increased to 45 kg/h over the course of 2.5 hours. In total, 194 kg were metered in.

30 minutes after the start of vinyl acetate metering, the initiator metering was begun. 300 g of t-butyl peroxypivalate and 170 g of t-butyl peroxy-2-ethylhexanoate dissolved in 1.5 liters of isopropanol were metered in at a constant rate over 7 hours. After the end of the initiator metering and the fall of the internal temperature to 75° C., the isopropanol and the residual vinyl acetate were distilled off, first at atmospheric pressure, then under reduced pressure at a pressure of 0.9 bar absolute. To remove residual traces of volatile organic substances, water was added twice, one liter each time, and distilled off under reduced pressure. Yield: 202 kg (99%) of polyvinyl acetate, Viscosity (10% by weight solution in ethyl acetate): 1.3 mPas, Number average molecular weight $M_n$: 5,900, Weight average molecular weight $M_w$: 15,000, Polydispersity: 2.5, Storage stability (12 hours at 130° C.): colorless and odorless.

Example 3

The procedure of Example 2 was used, but 80 kg of vinyl acetate and 24 kg of isopropanol were charged initially, and a total of 140 kg of vinyl acetate were metered in. Yield 216 kg (98%), Viscosity (10% by weight solution in ethyl acetate): 2.18 mpas, Number average molecular weight $M_n$: 10,700, Weight average molecular weight $M_w$: 28,300, Polydispersity: 2.64, Storage stability (12 hours at 130° C.): colorless and odorless.

Example 4

The procedure of Example 2, but 77.5 kg of vinyl acetate and 13 kg of isopropanol were charged initially and a total of 158 kg of vinyl acetate were metered in. Yield 231 kg (99%), Viscosity (10% by weight solution in ethyl acetate): 2.81 mPas, Number average molecular weight $M_n$: 13,500, Weight average molecular weight $M_w$: 48,100, Polydispersity: 3.55, Storage stability (12 hours at 130° C.): colorless and odorless.

Example 5

The procedure of Example 2 was used, but 62 kg of vinyl acetate and 9 kg of isopropanol were charged initially, and a total of 166 kg of vinyl acetate were metered in. Yield 223 kg (98%), Viscosity (10% by weight solution in ethyl acetate): 2.18 mPas, Number average molecular weight $M_n$: 16,100, Weight average molecular weight $M_w$: 53,600, Polydispersity: 3.32, Storage stability (12 hours at 130° C.): colorless and odorless.

Example 6
Ethanol Chain Transfer Agent; Semi-Batch Procedure 51 kg of ethanol and 14 kg of vinyl acetate together with 45 ml of t-butyl peroxypivalate (75% strength in isododecane) were charged initially into a 250 l reactor and the reactor was heated to 65° C., after which heating stopped, and the reaction began. As soon as the internal temperature had reached 76° C., vinyl acetate metering was started. 161 kg of vinyl acetate were metered in in the course of 12 hours. 30 minutes after starting the vinyl acetate metering, the initiator metering was started. 370 g of t-butyl peroxypivalate dissolved in 1.5 liters of isopropanol were metered in at a constant rate over 15 hours. After the end of the initiator metering and fall of the internal temperature to 75° C., the isopropanol and residual vinyl acetate were distilled off, initially at atmospheric pressure, then under reduced pressure at a pressure of 0.9 bar absolute. To remove residual traces of volatile organic substances, water was added twice, one liter each time, and distilled off under reduced pressure. Yield: 199 kg (94%) of polyvinyl acetate, Viscosity (10% by weight solution in ethyl acetate): 1.3 mPas, Number average molecular weight $M_n$: 6,800, Weight average molecular weight $M_w$: 15,500, Polydispersity: 2.3, Storage stability (12 hours at 130° C.): colorless and odorless.

Comparative Example C7:
Acetaldehyde Chain Transfer Agent; Batch Procedure 166 kg of vinyl acetate, 15 kg of acetaldehyde and 80 g of t-butyl peroxy-2-ethylhexanoate were charged initially into a 250 l reactor. The reactor was then heated to 65° C., after which heating was stopped, and the reaction began. After approximately 4.5 hours, the exothermic reaction had subsided; the reactor was then heated further for 2 hours using vessel jacket heating for further reaction, to a maximum internal temperature of 120° C. The residual organic constituents were then removed by distillation, first under atmospheric pressure, then under reduced pressure at a pressure of 0.9 bar absolute. To remove residual traces of volatile organic substances, water was added three times, one liter each time, and distilled off under reduced pressure. Yield: 142 kg (85%) of polyvinyl acetate, Viscosity (10% strength solution in ethyl acetate): 1.3 mPas, Number average molecular weight $M_n$: 6,000, Weight average molecular weight Mw: 14,100, Polydispersity: 2.35, Storage stability (12 hours at 130° C.): yellow discoloration, strong odor of acetic acid.

Testing of products from Examples 1 to 6 and Comparative Example C7 with respect to their thermal stability:

To test the products for their thermal stability, 20 g of product were placed in a 100 ml screw-top container and closed gas-tight. The samples were then stored for 12 hours in a drying cabinet at 130° C. To assess the thermal stability, firstly the discoloration was rated visually by eye, secondly the glass was opened and the odor was assessed. The results are summarized in Table 1:

TABLE 1

| Example | Color | Odor | Chain transfer agent |
|---|---|---|---|
| Example 1 | colorless | none | isopropanol |
| Example 2 | colorless | none | isopropanol |
| Example 3 | colorless | none | isopropanol |
| Example 4 | colorless | none | isopropanol |
| Example 5 | colorless | none | isopropanol |
| Example 6 | colorless | none | ethanol |
| Example C7 | yellow | acetic acid | acetaldehyde |

Testing of products from (comparative) examples 1 to 7 with respect to their chemical stability toward nucleophiles:

Test 1: The solid resin was mixed intimately with aspartame (16% by weight) for 30 minutes at 120° C., then the color and odor were determined. The results are summarized in Table 2.

TABLE 2

| Example | Color | Odor | Chain transfer agent |
|---|---|---|---|
| Example 1 | white | none | isopropanol |
| Example 2 | white | none | isopropanol |
| Example 3 | white | none | isopropanol |
| Example 4 | white | none | isopropanol |
| Example 5 | wgite | none | isopropanol |
| Example 6 | white | none | ethanol |
| Example C7 | brown | acetic acid | acetaldehyde |

Test 2: 10 g of solid resin were dissolved in 90 ml of methanol and then 30 ml of water were added. A little phenolphthaleine solution was added to the solution as indicator and the color change to pink was set using 0.1 n NaOH. The solution was observed to see if it decolorized again, which would indicate consumption of alkali. The results are summarized in Table 3.

TABLE 3

| Example | Color change | Chain transfer agent |
|---|---|---|
| Example 1 | none | isopropanol |
| Example 2 | none | isopropanol |
| Example 3 | none | isopropanol |
| Example 4 | none | isopropanol |
| Example 5 | none | isopropanol |
| Example 6 | none | ethanol |
| Example C7 | yes, rapid | acetaldehyde |

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention. The terms "a" and "an" mean "one or more than one" unless indicated otherwise.

What is claimed is:

1. A process for the preparation of solid polyvinyl ester resins by bulk or solution polymerization, said process comprising:
   polymerizing one or more monomers selected from the group consisting of
   a) vinyl ester(s) of unbranched or branched alkyl carboxylic acids having 1 to 15 carbon atoms;
   b) non-functional unsaturated monomers; and
   c) functional monomers selected from the group consisting of carboxyl group-containing unsaturated monomers, hydroxyethylacrylate, and hydroxypropyl acrylate,
   and isolating a solid polyvinyl ester resin product, with the proviso that at least one monomer a) is polymerized,
   said step of polymerizing taking place in the presence of at least one chain transfer agent selected from the group consisting of monovalent $C_{1-6}$ aliphatic alcohols and esters of $C_{1-4}$ aliphatic monocarboxylic acids with C1–4 aliphatic alcohols.

2. The process of claim 1, wherein said non-functional unsaturated monomers are selected from the group consisting of isopropenyl acetate, ethylene, propylene, and mixtures thereof.

3. The process of claim 1, wherein said functional carboxyl group-containing monomers are selected from the group consisting of crotonic acid, acrylic acid, maleic acid, fumaric acid, itaconic acid, and mixtures thereof.

4. The process of claim 1, wherein said polyvinyl ester resin is prepared by polymerizing monomers selected from the group consisting of vinyl esters of unbranched or branched alkyl carboxylic acids having 1 to 15 carbon atoms.

5. The process of claim 1, wherein said polyvinyl ester resin is a vinyl acetate homopolymer.

6. The process of claim 1, wherein said polyvinylester resin is prepared by polymerizing vinyl acetate and optionally one or more comonomers selected from the group consisting of isopropenyl acetate, ethylene, propylene, crotonic acid, acrylic acid, maleic acid, fumaric acid, and itaconic acid.

7. The process of claim 1, wherein said chain transfer agent is selected from the group consisting of methanol, ethanol, n-propanol, i-propanol, n-butanol, i-butanol, t-butanol, methyl acetate, ethyl acetate, and mixtures thereof.

8. The process of claim 2, wherein said chain transfer agent is selected from the group consisting of methanol, ethanol, n-propanol, i-propanol, -butanol, i-butanol, t-butanol, methyl acetate, ethyl acetate, and mixtures thereof.

9. The process of claim 3, wherein said chain transfer agent is selected from the group consisting of methanol, ethanol, n-propanol, i-propanol, -butanol, i-butanol, t-butanol, methyl acetate, ethyl acetate, and mixtures thereof.

10. The process of claim 4, wherein said chain transfer agent is selected from the group consisting of methanol, ethanol, n-propanol, i-propanol, -butanol, i-butanol, t-butanol, methyl acetate, ethyl acetate, and mixtures thereof.

11. The process of claim 5, wherein said chain transfer agent is selected from the group consisting of methanol, ethanol, n-propanol, i-propanol, -butanol, i-butanol, t-butanol, methyl acetate, ethyl acetate, and mixtures thereof.

12. The process of claim 1, wherein at least one said chain transfer agent is isopropanol.

13. The process of claim 1, wherein the molar ratio of vinyl ester and optional comonomers to chain transfer agent is from 0.05 to 4.0.

14. The process of claim 1, wherein a solid polyvinyl ester resin having a weight average molecular weight $M_W$ of 10,000 to 100,000 is obtained.

15. In a process for preparing solid polyvinyl ester resins employing a bulk or solution polymerization process in the presence of a chain transfer agent, the improvement comprising polymerizing one or more vinyl esters of unbranched or branched alkyl carboxylic acids having 1 to 15 carbon atoms and optionally further unsaturated copolymerizable comonomers in the presence of one or more chain transfer agents selected from the group consisting of monovalent $C_{1-6}$ aliphatic alcohols, esters of $C_{1-4}$ aliphatic monocarboxylic acids with $C_{1-4}$ aliphatic alcohols, and $C_{3-6}$ aliphatic ketones, wherein a first portion of monomer(s) and chain transfer agent are charged initially in a molar ratio of monomers to chain transfer agent which achieves a targeted degree of polymerization, and after a conversion, in the presence of a first portion of initiator, of from 40 to 60% of monomer to polymer is achieved, a second portion of monomer(s) and optionally a further portion of initiator are added at a metering rate which ensures that said molar ratio of monomer/chain transfer agent is maintained substantially constant over the entire reaction period.

16. The process of claim 15, wherein said further copolymerizable comonomers are selected from the group consisting of carboxyl group-containing comonomers; hydroxyethylacrylate, and hydroxypropyl acrylate; and mixtures thereof.

17. The process of claim 15 wherein said chain transfer agent is selected from the group consisting of methanol, ethanol, n-propanol, i-propanol, n-butanol, i-butanol, t-butanol, methyl acetate, ethyl acetate, and mixtures thereof.

18. The process of claim 15, wherein at least one chain transfer agent is isopropanol.

19. The process of claim 15, wherein the sole monomer is vinyl acetate.

20. The process of claim 15, wherein vinyl acetate is employed as a monomer, and one or more of isopropenyl acetate, ethylene, and propylene are employed as the only comonomers.

* * * * *

UNITED STATES PATENT AND TRADEMARK OFFICE
CERTIFICATE OF CORRECTION

PATENT NO. : 6,939,931 B2
DATED : September 6, 2005
INVENTOR(S) : Peter Tschirner et al.

It is certified that error appears in the above-identified patent and that said Letters Patent is hereby corrected as shown below:

Column 7,
Lines 53 and 58, delete "-butanol" and insert therefor -- n-butanol --.

Column 8,
Lines 3 and 8, delete "-butanol" and insert therefor -- n-butanol --.

Signed and Sealed this

Twenty-second Day of November, 2005

JON W. DUDAS
*Director of the United States Patent and Trademark Office*